(12) United States Patent
Peele

(10) Patent No.: US 6,603,284 B2
(45) Date of Patent: *Aug. 5, 2003

(54) METHODS OF CHARGING BATTERIES INCLUDING RECEIVING A MAGNETIC FORCE IN A MON-GALVANIC MANNER AND RELATED DEVICES AND CHARGES

(75) Inventor: James Calvin Peele, Raleigh, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/906,953

(22) Filed: Jul. 16, 2001

(65) Prior Publication Data

US 2002/0093309 A1 Jul. 18, 2002

Related U.S. Application Data

(63) Continuation of application No. 09/218,971, filed on Dec. 22, 1998, now Pat. No. 6,288,519.

(51) Int. Cl.[7] ................... H01M 10/46; H01M 10/44
(52) U.S. Cl. ................................................. 320/107
(58) Field of Search ............................ 320/107, 108, 320/112, 114, 115; 310/78, 75 R

(56) References Cited

U.S. PATENT DOCUMENTS

| 3,618,070 A | 11/1971 | Kagan |
| 3,935,487 A | 1/1976 | Czerniak |
| 4,360,771 A | 11/1982 | Grenlund |
| 5,532,982 A | 7/1996 | Beguin et al. |
| 5,536,979 A | 7/1996 | McEachern et al. |
| 5,642,413 A | 6/1997 | Little |
| 5,644,207 A | 7/1997 | Lew et al. |
| 5,712,519 A | 1/1998 | Lamb |
| 5,787,168 A | 7/1998 | Lien |
| 5,847,541 A | 12/1998 | Hahn |
| 5,875,691 A | 3/1999 | Hata et al. |
| 5,889,349 A | 3/1999 | Yasuda |
| 5,889,384 A | 3/1999 | Hayes et al. |
| 6,002,927 A | 12/1999 | Hayes, Jr. |
| 6,288,519 B1 * | 9/2001 | Peele .................. 320/107 |

FOREIGN PATENT DOCUMENTS

| DE | 2106183 | 2/1971 |
| EP | 0188865 | 7/1985 |
| EP | 0786849 | 1/1996 |
| GB | 2281796 | 6/1994 |

* cited by examiner

*Primary Examiner*—Edward H. Tso
(74) *Attorney, Agent, or Firm*—Myers Bigel Sibley & Sajovec

(57) ABSTRACT

An electric charging system includes an electrical charger that generates a magnetic force and a device with an electric current generator that receives a portion of the magnetic force in a non-galvanic manner. The electric current generator generates an electric current in response to receiving the portion of the magnetic force and the electric current is received by a battery.

56 Claims, 5 Drawing Sheets

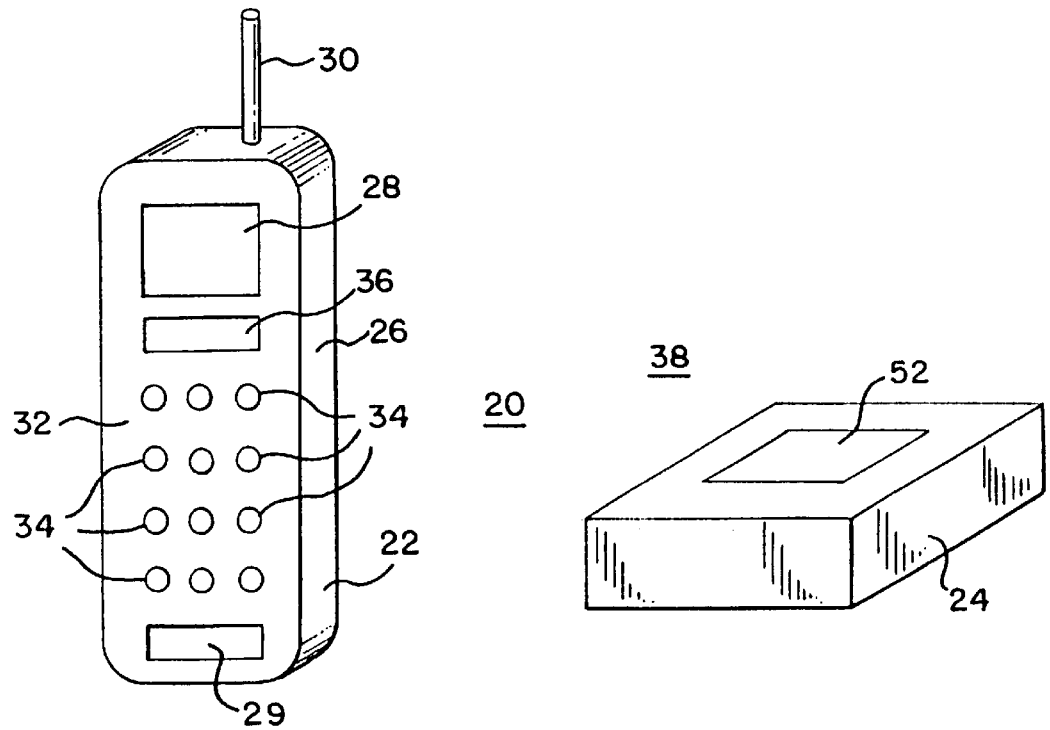
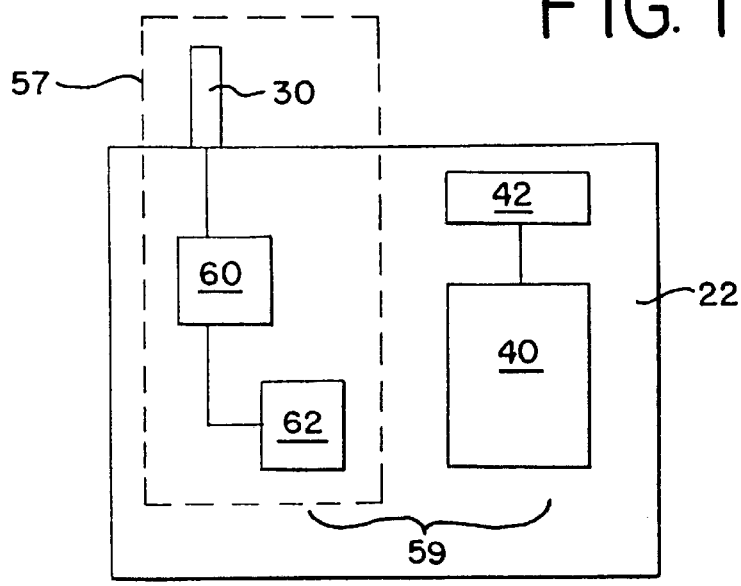

METHODS OF CHARGING BATTERIES INCLUDING RECEIVING A MAGNETIC FORCE IN A MON-GALVANIC MANNER AND RELATED DEVICES AND CHARGES

RELATED APPLICATION

The present application is a continuation application claiming priority from U.S. patent application Ser. No. 09/218,971 entitled CHARGING METHOD FOR A PRODUCT USING RECHARAGEABLE BATTERIES filed Dec. 22, 1998, now U.S. Pat. No. 6,288,519 the disclosure of which is hereby incorporated herein in its entirety by reference.

BACKGROUND OF THE INVENTION

1. Field of the Invention

The present invention relates to a charging and/or vibrating system for a rechargeable device, such as a telephone.

2. Discussion of Related Art

In the past, the battery of a rechargeable device was recharged via a galvanic contact between the charging source and the rechargeable device. However, the galvanic contacts may be prone to break. The galvanic contact was potentially subject to attack by water or other fluids or gasses that could cause the contacts to oxidize or otherwise corrode and increase the contact impedance. Likewise, the open connection required by galvanic contacts was potentially susceptible to water or other fluids or gasses, allowing same to enter the rechargeable device.

SUMMARY OF THE INVENTION

One aspect of the present invention relates to an electric charging system and method that use an electrical charger generating a magnetic force that acts on an electric current generator. The electric current generator receives a portion of the magnetic force in a non-galvanic manner and generates an electric current therefrom, and a battery that receives the electric current.

A second aspect of the present invention relates to a non-galvanic electric charging system and method that has a magnetic shield movable from a shielded position to an unshielded position.

A third aspect of the present invention regards an electric charging and vibrating system that includes an electrical charger that generates a magnetic force that acts on a device having an electric current generator. The device receives a portion of the magnetic force in a non-galvanic manner and generates an electric current therefrom and a battery that receives the electric current. The device also includes a receiver that receives a telecommunications message and generates an electrical signal upon receipt of the telecommunications message and a vibration generator that receives the electrical signal and vibrates the device upon receipt of the electrical signal so that a user can readily feel the device vibrating.

Each of the above aspects of the present invention provides the advantage of providing a rechargeable device that does not require non-galvanic contacts and so provides a more cost efficient and aesthetically pleasing rechargeable device.

Each of the above aspects of the present invention provides the advantage of charging a battery in a,device while reducing the chance that harmful fluids or gases will enter the device.

The second aspect of the present invention provides the additional advantage protecting the recharged device from receiving or sending unwanted magnetic forces.

The third aspect of the present invention provides the additional advantage of silently alerting the user of a telephone that his or her telephone has received a telecommunications message while at the same time reducing the chance that harmful fluids or gases will enter the device.

Further advantages and details of the invention will become apparent from the ensuing description of an exemplary embodiment in conjunction with the accompanying drawings.

BRIEF DESCRIPTION OF THE DRAWINGS

FIG. 1A schematically shows an electric charging and vibrating system according to the present invention;

FIG. 1B schematically shows an interior view of a telephone to be used with the electric charging and vibrating system of FIG. 1A;

DESCRIPTION OF THE PREFERRED EMBODIMENT

Figure 2:
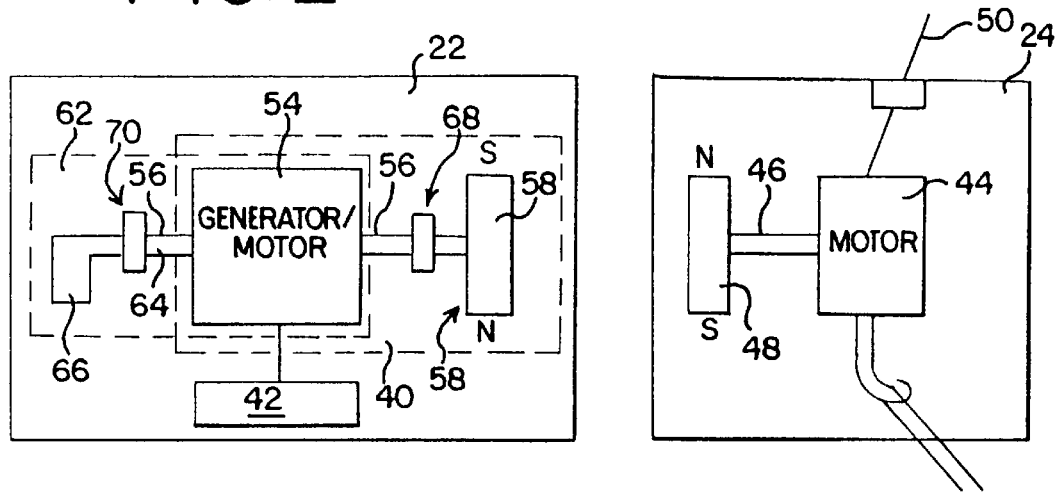
FIG. 2 schematically shows a first embodiment of the electric charging and vibrating system of FIG. 1A.

An electric charging and vibrating system according to the present invention is schematically shown by the telephone systems 20 of FIGS. 1–4, wherein like elements are identified by like numerals. A telephone system 20 is schematically shown in FIG. 1A and includes a rechargeable device, such as telephone 22, and an electrical charger 24. As shown in FIGS. 1A–B, the telephone 22 includes a housing 26, an earphone 28 for listening and a microphone 29 for talking. The telephone has an antenna 30 for receiving and sending wireless telecommunications messages. The front face 32 of the telephone 22 also has a number of keys 34 that perform in a well known manner a variety of functions when activated by being depressed. For example, the keys associated with the numerical digits 0–9, respectively, are used to dial in a telephone number by pressing the keys associated with the telephone number. The remaining keys may perform such functions as (1) sending a telephone number after entering the telephone number, (2) opening up a menu of functions that can be performed by the telephone 22 or muting the user during a telephone call, (3) ending a phone call and turning the telephone 22 on and off, respectively, in a well known manner when depressed, (4) scrolling the menu, (5) storing or recalling a stored message, (6) clearing or erasing a telephone number and (7) raising or lowering the volume of the message heard in the earphone. Note that when one or more of the keys 34 are depressed, the display 36, such as a segmented alpha-numeric liquid crystal display, displays the keys pressed or other messages or menu functions in a well known manner. It is understood that a wide variety of telephones and other rechargeable devices can employ the present invention without departing from the spirit of the invention. Note that the term telephone includes cellular phones, cordless telephones, pagers and the like.

As shown in the internal view of FIG. 1B, the telephone 22 has a number of components that allow the telephone 22 to form an electric charging system 38 in conjunction with an electrical charger 24. For example, the telephone 22 has an electric current generator 40 that generates an electric current that is received by a rechargeable battery 42. The electric current generator 40 and the battery 42 are isolated from the ambient atmosphere so that they are not substantially exposed to external gases or liquids that can degrade the electric current generator 40 or the battery 42. While not shown, the battery 42 supplies power to other components of the telephone 22, such as the display 36, a microprocessor that controls the functioning of the telephone 22 and light emitting diodes (LED's) associated with the keys 34.

The electric current generator 40 operates by being acted upon in a non-galvanic manner by a magnetic force generated by the electrical current charger 24 in a manner so as to generate an electric current for recharging the battery 42. The electric current generator 40 receives the magnetic force in a non-galvanic manner in that the generator 40 does not receive a direct current of electricity from the generator 40 through a direct electrical contact with the electrical charger 24 that allows a direct current to be transferred from the charger 24 to the battery 42. Instead, the electrical charger 24 acts on the electric current generator 40 without the need for a direct electrical contact between the telephone 22 and the electrical charger 24. As shown in FIGS. 2, 3, 6 and 9, the electrical charger 24 includes a motor 44 that is electrically connected to a voltage supply like a common household electrical outlet. The motor 44 has a cylindrical and metallic shaft 46 that is rotatably attached thereto. An annular magnet 48 is attached to the distal end of the rotatable shaft 46 so that rotation of the shaft 46 causes the magnet 48 to rotate about an axis. The magnet 48 has an outer diameter of approximately 15 mm and a thickness of approximately 2 mm and is made of a magnetic material such as Alnico that is permanently polarized North-South (N-S) across a major axis or diameter of the magnet. When the power switch 50 of the electrical charger 24 is switched to the "ON" position, the motor 44 is turned on turning the rotatable shaft 46 and the magnet 48 at a constant rate of approximately 1000 revolutions per minute, for example.

Figure 3A:
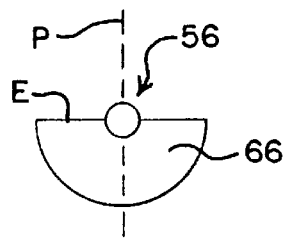
FIG. 3A shows a front view of an offset mass used with the electric charging and vibrating system of FIG. 2.
Figure 3B:
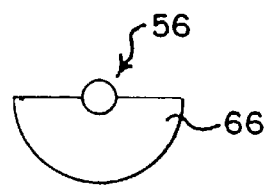
FIG. 3B shows a rear view of the offset mass of FIG. 3A.
Figure 4A:
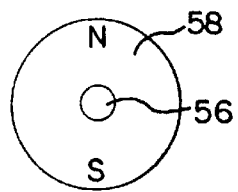
FIG. 4A shows a front view of a magnet used with the electric charging and vibrating system of FIG. 2.
Figure 4B:
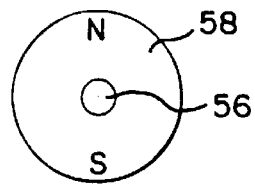
FIG. 4B shows a rear view of the magnet of FIG. 4A.

When the rechargeable telephone 22 is supported within the cradle or receiving area 52 of the electrical charger 24, the electrical charger generates a magnetic force, via magnet 48 that acts upon the electric current generator 40. As shown in FIGS. 2–11, a number of embodiments for the electric current generator 40 are possible. One such embodiment is shown in FIGS. 2–4 where the electric current generator 40 includes a generator/motor 54, hereinafter called a motor, that has a rotatable shaft 56 with an annular magnet 58 that engages the distal end of the rotatable shaft 56. The magnet 58 preferably has the same dimensions and is made of the same material and has the same polarization as that of the magnet 48 of the electrical charger 24, although other configurations are possible and clear to one skilled in the art.

With the above description of the electric current generator 40 in mind, the process of recharging of the battery 42 is understood. When the rechargeable telephone 22 is placed within the receiving area 52, the electrical charger 24 is turned on causing the motor 44 to rotate the magnet 48 so as to generate a magnetic force that acts on the electric current generator 40. Since the magnets 48 and 58 are separated from one another by a small distance such as approximately 2 mm, for example, the magnets are magnetically coupled to each other to such an extent that rotation of the magnet 48 causes the magnet 58 to rotate. As shown in FIG. 2, the North pole of the magnet 48 faces opposite the South pole of the magnet 58 so that the magnets are attracted to each other. Rotation of the North pole of the magnet 48 will cause the South pole of the magnet 58 to follow the North pole of the magnet 48 due to the attractive coupled magnetic forces between the two magnets. Thus, rotation of the magnet 48 causes the magnet 58 to rotate about an axis that is aligned with the axis of rotation of the magnet 48. Rotation of the magnet 58 causes the rotatable shaft 56 to rotate. Rotation of the shaft 56 causes the motor 54 to generate an electric current which is directed to the battery 42 so as to recharge the battery. Note that while the electric current generator 40 described above generates a current in response to the coupled magnetic forces between the permanent magnets 48 and 58, it is contemplated that other non-galvanic recharging systems are possible that operate based on electromagnetic energy and forces that are generated by and coupled by the electric current generator 40 and the electrical charger 24 with or without the use of permanent magnets.

The electrical charging system that includes the electrical charger 24 and the electric current generator 40 can be used in conjunction with a vibrating system 57 so as to define an electric charging and vibrating system 59 that causes the telephone 22 to vibrate so as to alert a user that the telephone 22 has received a telecommunications message. A well known vibrating system 57 is generally shown in FIGS. 1B and 2, the telephone 22 includes a receiver 60 electrically connected to the antenna 30. The receiver 60 receives a telecommunications message from the antenna 30 and generates an electrical signal upon receipt of the telecommunications message. The electrical signal is transmitted to a vibration generator 62 that causes the telephone 22 to vibrate upon receipt of the electrical signal. The vibrations caused by the vibration generator are of sufficient magnitude so that a user can readily feel the telephone 22 vibrating and so the user is alerted to the receipt of a telecommunications message by the telephone 22.

As shown in FIG. 2, the vibration generator 62 includes the motor 54 and the portion 64 of the rotatable shaft 56 that is attached to the motor 54 on a side of the motor 54 opposite to that to which the other portion of the shaft 56 is attached to the magnet 58. A mass 66 is attached to a distal end of the portion 64 of the rotatable shaft 56. When the motor 54 receives the electrical signal from the receiver 60, the motor 54 rotates the shaft 56 and the mass 66 attached thereto in a sense that is opposite to that of the magnet 58. As shown in FIGS. 2 and 3, the mass 66 is offset with respect to the axis of rotation of the shaft 56. For example, the mass 66 may be offset by having a semi-circular shape that is symmetrical about a plane P that is perpendicular to a straight edge E of the mass 66. The semi-circular mass 66 has a mass of approximately 10 g, has a diameter of approximately 6 mm and a thickness of approximately 4 mm. Consequently, the rotational movement of the offset mass 66 causes the telephone 22 to vibrate to such an extent that a user can readily feel the telephone vibrate.

In the embodiment of FIGS. 2–4, the magnet 58 and the mass 66 are rotatably attached to the motor 54 by a common shaft 56 in a manner that is different than previous vibrating systems. As mentioned above, the magnet 58 and the mass 66 rotate in opposite senses. In order to accomplish opposite rotations while the magnet 58 and the mass 66 share the same shaft 56, the magnet 58 and mass 66 are attached to the rotatable shaft 56 in a manner different than known vibrating systems by a rotation direction sensitive clutches 68 and 70, respectively. When the magnet 58 begins to rotate in a first sense in response to the rotation of the magnet 48, the clutch 68 engages the shaft 56 so that the shaft rotates in the same sense as the magnet 58. While the shaft 56 rotates, the other clutch 70 is oriented such that it does not engage the shaft 56 when rotating in the first sense so that the mass 66 does not rotate. In the case when the mass 66 rotates, the rotation direction sensitive clutch 70 engages the rotatable shaft 56 when the motor 54 rotates the shaft 56 in a sense opposite to the first sense upon receipt of the electrical signal from the receiver 60. In such a case, the clutch 68 is oriented so as not to engage the shaft 56 and so the magnet 58 does not rotate. Thus, the rotation direction sensitive clutches 68 and 70 function so as to prevent the mass 66 and the magnet 58 from rotating simultaneously.

Figure 5:
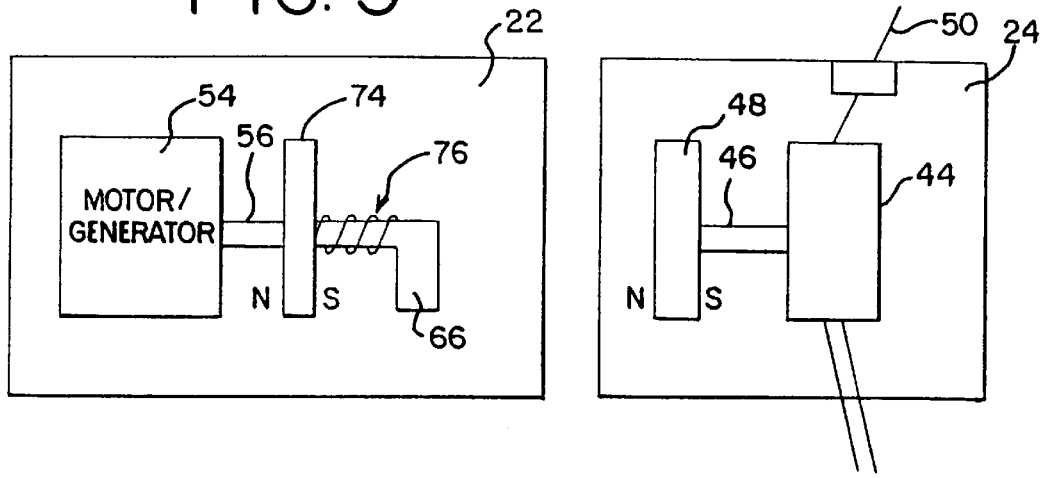
FIG. 5 schematically shows a second embodiment of the electric charging and vibrating system of FIG. 1A.
Figure 6A:
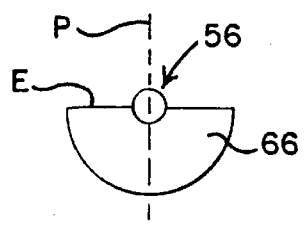
FIG. 6A shows a front view of an offset mass used with the electric charging and vibrating system of FIG. 5.
Figure 6B:
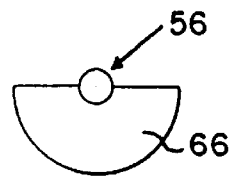
FIG. 6B shows a rear view of the offset mass of FIG. 6A.
Figure 7A:
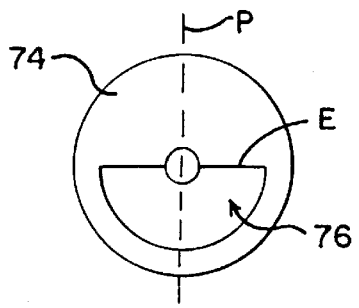
FIG. 7A shows a front view of, a magnet used with the electric charging and vibrating system of FIG. 5.
Figure 7B:
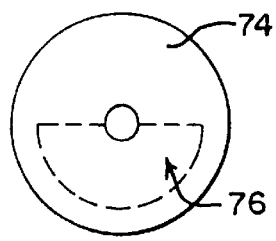
FIG. 7B shows a rear view of the magnet of FIG. 7A.

Another embodiment of an electric charging and vibrating system 59 is shown in FIGS. 5–7. In that embodiment, the electric current generator 40 includes a motor 54 that has a single rotatable shaft 56 attached to one side of the motor 54. The rotatable shaft 56 is inserted through a central opening 72 of an annular-like magnet 74 but the shaft 56 is not attached to the magnet 74 so that the magnet 74 is able to translate along the shaft 56. The magnet 74 preferably has the same general dimensions and is made of the same material and has the same polarization as that of the magnet 48 of the electrical charger 24. In particular, the magnet 74 is annular in shape having a maximum diameter of approximately 15 mm and a thickness of approximately 4 mm. The magnet 74 is made of a magnet material such as Alnico and has a North-South polarization along the minor axis of the magnet. As shown in FIG. 7A, the magnet 74 includes a cut-out area or recess 76 having a semi-circular-like shape that is symmetrical about a plane P that is perpendicular to a straight edge E of the recess 76 and lies along a diameter of the magnet 74. The semi-circular recess 76 has a diameter of 10 mm or less and a depth of approximately 2 mm. The function of the recess 76 will be explained in detail below.

At a distal end of the shaft 56, a mass 66 is attached thereto that is offset with respect to the axis of rotation of the shaft 56. The mass 66 preferably has the same shape as the mass 66 of FIGS. 3A and B. The magnet 74 and the mass 66 are attached to opposite ends of a spring 76 located therebetween and wound about the shaft 56. The spring 76 biases the magnet 74 away from the mass 66.

With the above description of the electric charging and vibrating system 59 in mind, the process of recharging and vibrating the telephone 22 is easily understood. The process of recharging occurs when the rechargeable telephone 22 is placed within the receiving area 52 of the electrical charger 24. As shown in FIG. 5, the North pole of the magnet 48 faces the South pole of the magnet 74. Since the magnets 48 and 74 are separated from each other by a small distance, the magnet 74 is attracted towards the magnet 48 so that the magnet 74 overcomes the spring 76 and translates along the shaft 56 relative to the vibrating system 57 and the mass 66 until its recess 76 is engaged and interlocked by the offset mass 66 during initial rotation of the magnet 74. As shown in FIGS. 5–6, the mass 66 has a semi-circular shape that matches the shape of the recess 76 so that the recess 76 snugly engages the mass 66. The engaged mass 66 may or may not fit entirely within the recess 76.

Once the recess 76 is engaged by the mass 66, turning on the electrical charger 24 causes the motor 44 to rotate the magnet 48 so as to generate a magnetic force that acts on the magnet 74 in a manner described previously with the embodiment of FIG. 2. The magnetic force is generated in a non-galvanic manner and causes the magnet 74 to rotate. Since the magnet 74 engages the mass 66, rotation of the magnet 74 causes the mass 66 and the rotatable shaft 56 to rotate synchronously relative to the magnet 74. Rotation of the shaft 56 causes the motor 54 to generate an electric current which is directed to the battery 42 so as to recharge the battery.

The vibrating system 57 of the embodiment of FIGS. 5–7 operates in a manner similar to that of the vibrating system 57 of FIGS. 2–4. In particular, once the motor 54 receives the electrical signal from the receiver 60, the motor 54 rotates the shaft 56 and the mass 66 attached thereto relative to the electric current generator 40 in a sense that is opposite to that of the magnet 58. Note that when the shaft 56 initially rotates, the magnet 74 may initially slip on the shaft 56. In such a case, the magnet 74 provides only a minute resistance to the rotation of the shaft 56. The rotational movement of the offset mass 66 causes the telephone 22 to vibrate to such an extent that a user can readily feel the telephone vibrate. Note that when the offset mass 66 engages the magnet 74 and rotates, the rotating mass 66 does not cause the telephone 22 to vibrate because the engaged combination of the mass 66 and magnet 74 provides a uniform mass of distribution relative to the shaft 56.

Figure 8:
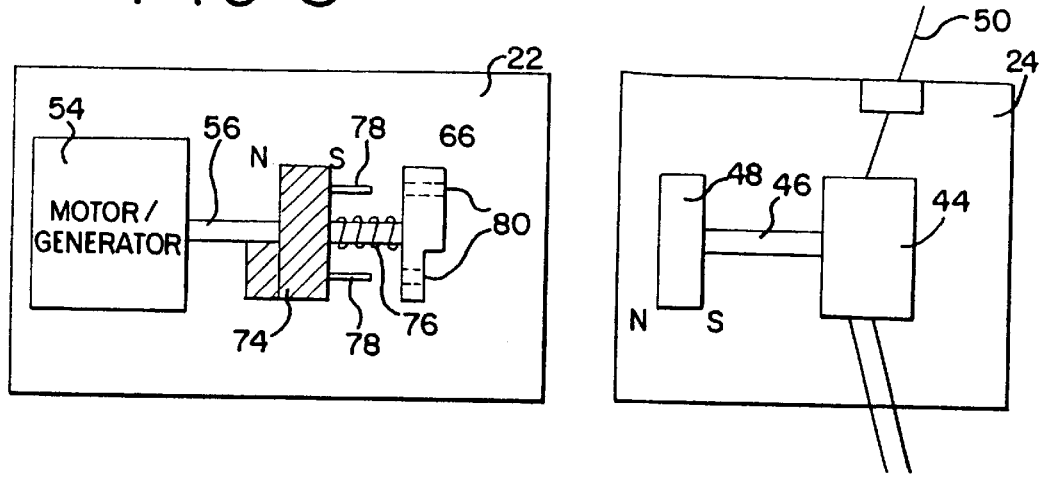
FIG. 8 schematically shows a third embodiment of the electric charging and vibrating system of FIG. 1A.
Figure 9A:
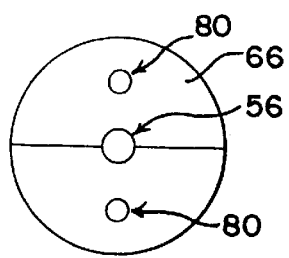
FIG. 9A shows a front view of an offset mass used with the electric charging and vibrating system of FIG. 8.
Figure 9B:
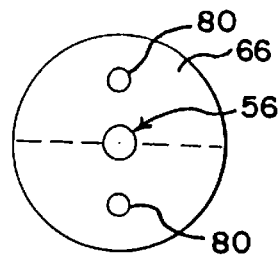
FIG. 9B shows a rear view of the offset mass of FIG. 9A.
Figure 10A:
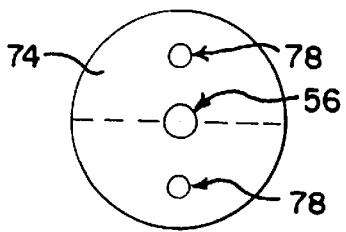
FIG. 10A shows a front view of a magnet used with the electric charging and vibrating system of FIG. 8.
Figure 10B:
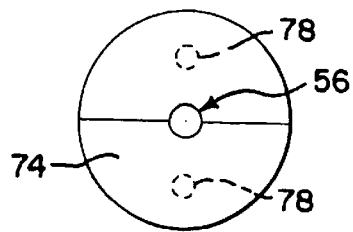
FIG. 10B shows a rear view of the magnet of FIG. 10A.

A variation of the electric charging and vibrating system 59 of FIGS. 5–7 that operates in a similar manner is shown in FIGS. 8–10. Among the differences is that the magnet 74 has a shape that has a portion offset with respect to the shaft 56 as shown in FIGS. 8 and 10A–B. The offset mass 66 has a different shape as well as shown in FIGS. 8–9. Engagement of the magnet 74 with the mass 66 is accomplished by a plurality of alignment pins 78 that are attached to the magnet 74 and that are inserted into corresponding alignment holes 80 formed in the mass 66 when the magnet 48 of the electrical charger 24 attracts the magnet 74 towards the mass 66. Of course, the alignment pins and holes can be reversed. Note that when the offset mass 66 engages the offset magnet 74 and rotates, the rotating mass 66 does not cause the telephone 22 to vibrate because the engaged combination of the mass 66 and magnet 74 is not offset relative to the shaft 56. In other words, the mass of the offset portion of the magnet 74 is equal to and offsets the offset portion of the mass 66.

Figure 11:
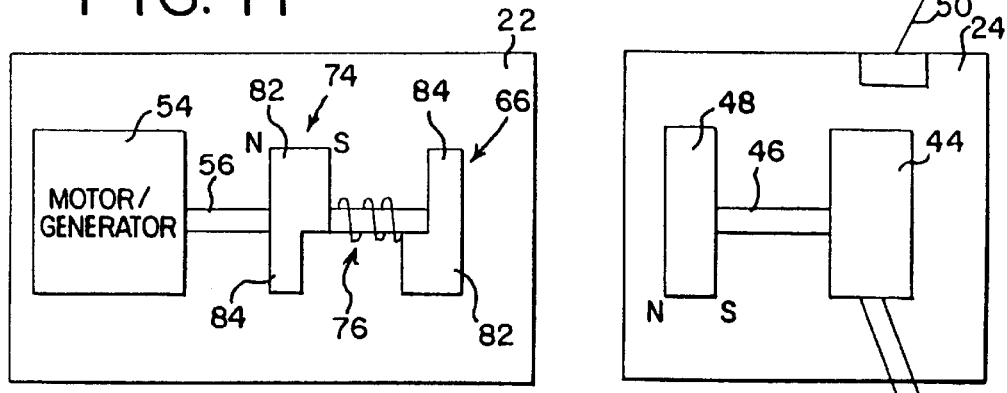
FIG. 11 schematically shows a fourth embodiment of the electric charging and vibrating system of FIG. 1A.
Figure 12A:
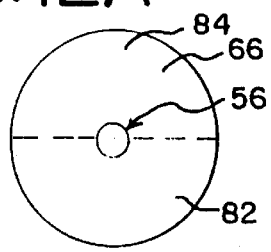
FIG. 12A shows a front view of an offset mass used with the electric charging and vibrating system of FIG. 11.
Figure 12B:
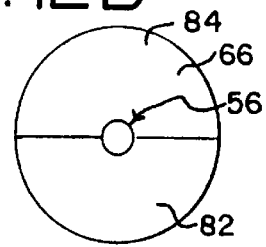
FIG. 12B shows a rear view of the offset mass of FIG. 12A.
Figure 13A:
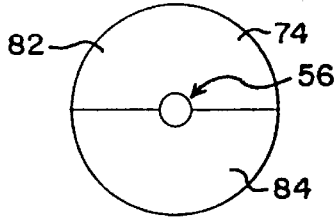
FIG. 13A shows a front view of a magnet used with the electric charging and vibrating system of FIG. 11.
Figure 13B:
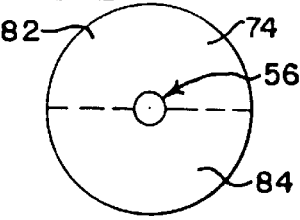
FIG. 13B shows a rear view of the magnet of FIG. 13A.

Another variation of the offset magnet 74 and offset mass 66 of FIGS. 8–10 is shown in FIGS. 11–13. The magnet 74 and mass 66 have complementary shapes so that when the magnet 74 engages the mass 66, the magnet and mass together define an annulus. As shown in FIGS. 12–13, the magnet 74 and mass 66 each have a circular outer circumference with a semi-circular area 82 that has a length as measured along the axis of the shaft 56 that is greater than the length of a second semi-circular area 84.

Figure 14:
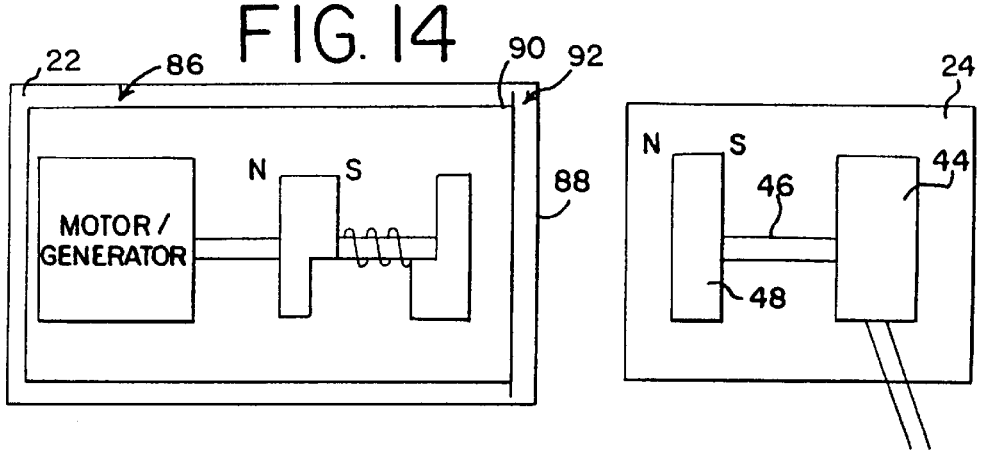
FIG. 14 schematically shows a magnet shield to be used with the electric charging and vibrating systems of FIGS. 1–13.

In order to minimize the potential for disturbances in surrounding media that may be caused by the magnets 58, 74 in the telephone 22, a magnetic shield 86 made of a material such as mu-metal, can be used with either of the charging and vibrating systems 59 of FIGS. 1–13. As shown in FIG. 14, the magnetic shield 86 is permanently fixed within the telephone 22 so as to surround a substantial portion of the electric current generator 40. The remaining portion of the electric current generator 40 is surrounded by a magnetic field permeable material 88, such as a plastic. Between the magnetic shield 86 is formed a slot or opening 90 into which a movable shield 92 is movable relative to the electric current generator 40 within the telephone 22 from a first position where the magnet 58, 74 is shielded from the magnetic fields generated by the magnet 48 to a second position where the electric current generator 40 receives the portion of the magnetic fields. Of course, moving the shield 92 to the first position shields the magnet 48 from any magnetic fields generated by the magnets 58, 74. The shield 86 is moved to the shielding position when the telephone 22 is not in contact with the receiving area 52 of the electrical charger 24. When the telephone 22 is in contact with the receiving area, the magnetic shield 86 moves to the second position where the magnet 58, 74 is exposed so as to receive a portion of the magnetic fields and forces generated by the magnet 48 in a non-galvanic manner. Note that the shield 86 can be either self-contained within the telephone 22 or the electrical charger 24 or the shield 86 can be removed from the telephone when the telephone is in contact with the receiving area 52 of the electric charger 24. In addition, the magnetic shield 86 may have a hinge to be pivoted into position. The magnetic shield 86 may be manually moved or mechanically moved by a mechanism similar to an actuator arm used for loading a floppy disk.

The invention may be embodied in other forms than those specifically disclosed herein without departing from its spirit or essential characteristics. The described embodiments are to be considered in all respects only as illustrative and not restrictive, and the scope of the invention is commensurate with the appended claims rather than the foregoing description.

I claim:

1. A portable device comprising:
an electric current generator that receives a magnetic force in a non-galvanic manner and converts said magnetic force into mechanical energy which generates an electric current, the electric current generator comprising a magnet; and
a battery that receives said electric current.

2. A device comprising:
an electric current generator that receives a magnetic force in a non-galvanic manner and converts said magnetic force into mechanical energy which generates an electric current, the electric current generator comprising a magnet that is rotatable and rotation of said magnet causes said electric current to be generated, said magnet engaged with a rotatable shaft so that rotation of said magnet causes said rotatable shaft to rotate;
a battery that receives said electric current; and
wherein said magnet translates along said rotatable shaft.

3. A device comprising:
an electric current generator that receives a magnetic force in a non-galvanic manner and converts said magnetic force into mechanical energy which generates an electric current, said electric current generator comprising a magnet;
a battery that receives said electric current; and
wherein the magnet of the electric current generator is adapted for coupling with a magnet of a charger.

4. The device of claim 3, wherein the polarization of said magnet of said electric current generator is equal to the polarization of said second magnet.

5. The device of claim 4 wherein said magnet of said electric current generator is polarized N-S across a minor axis thereof.

6. The device of claim 4 wherein said magnet of said electric current generator is polarized N-S across a major axis thereof.

7. The device of claim 3, wherein said magnet of said electric current generator rotates about a first axis and said second magnet rotates about a second axis.

8. The device of claim 7 wherein said first axis and said second axis are aligned with one another.

9. A method of charging a battery of a device, the method of comprising:
coupling a magnet in the device with a magnetic force to generate mechanical energy from the magnet in the device responsive to the magnetic force;
generating an electric current in said device from said mechanical energy; and
charging said battery with said electric current.

10. The method according to claim 9 wherein said device comprises a telephone.

11. The method according to claim 9 wherein coupling the magnet in the device with a magnetic force to generate mechanical energy from the magnet in the device responsive to the magnetic force comprises rotating the magnet responsive to the magnetic force.

12. A method of charging a battery of a device, the method comprising:
receiving a magnetic force at the device in a non-galvanic manner;
converting said magnetic force into mechanical energy by translating a magnet along a first direction;
generating an electric current from said mechanical energy; and
charging said battery with said electric current.

13. Method of charging a battery of a device, the method comprising:
receiving a magnetic force at the device in a non-galvanic manner;
converting said portion of said magnetic force into mechanical energy by rotating a magnet in the device in response to the received magnetic force;
generating an electric current from said mechanical energy; and
charging said battery with said electric current.

14. A rechargeable device comprising:
an electric current generator that receives a magnetic force in a non-galvanic manner and generates an electric current therefrom; and
a magnetic shield movable relative to said electric current generator from a first position wherein said magnet is shielded from said magnetic force to a second position where said electric current generator receives said magnetic force.

15. The rechargeable device of claim 14, wherein said device comprises a telephone.

16. The rechargeable device of claim 14, wherein said electric current generator comprises a magnet that receives said magnetic force.

17. The rechargeable device of claim 14, wherein said magnetic shield moves to said first position when said rechargeable device is not in contact with said receiving area of said electrical charger.

18. The rechargeable device of claim 14, wherein said magnetic shield moves to said second position when said rechargeable device is in contact with said receiving area of said electrical charger.

19. The rechargeable device of claim 17, wherein said magnetic shield moves to said second position when said rechargeable device is in contact with a receiving area of an electrical charger.

20. The rechargeable device of claim 14, wherein said magnetic shield comprises a mu-metal.

21. The rechargeable device of claim 14, wherein said rechargeable device comprises a battery that receives said electric current.

22. A method of charging a battery of a device, the method comprising:
moving a shield so that said device can receive a magnetic force in a non-galvanic manner;
generating an electric current from said magnetic force; and
charging said battery with said electric current.

23. The method of claim 22, wherein said moving of said shield results in the removal of said shield from said device.

24. The method of claim 22, wherein said device comprises a telephone.

25. A device that vibrates to indicate a message has been received, the device comprising:
a receiver that receives a message and generates an electrical signal upon receipt of said message; and
a vibration generator comprising:
a motor that receives said electrical signal, said motor comprising a shaft and having a first state wherein the shaft rotates in a first direction in response to receipt of said electrical signal, a second state wherein said shaft rotates in a second direction opposite the first direction, and a third state wherein the shaft does not rotate;
a rotation direction sensitive clutch engaged with said shaft, the shaft being configured to rotate in the first direction and to disengage from said shaft with the shaft rotating in the second direction; and
a mass attached to said clutch to rotate with the clutch with said shaft rotating in the first direction so as to cause said device to rotate.

26. The device of claim 25, wherein said device comprises a telephone.

27. The device of claim 25, wherein said mass is offset with respect to an axis of rotation of said rotatable shaft.

28. The device of claim 25, wherein said rotation direction sensitive clutch engages said rotatable shaft upon receipt of said electrical signal by said motor.

29. A device comprising:
an electric current generator that receives a magnetic force in a non-galvanic manner and converts said portion of said magnetic force into mechanical energy which generates an electric current;
a battery that receives said electric current;
a receiver that receives a message and generates an electric signal upon receipt of said telecommunications message; and
a vibration generator that receives said electrical signal and vibrates said device upon receipt of said electrical signal so that a user can readily feel said device vibrating.

30. The device according to claim 29 wherein the device comprises a telephone.

31. The device according to claim 29 wherein said electric current generator comprises a magnet and said vibration generator comprises a mass.

32. The device according to claim 31 wherein said magnet is movable relative to said mass.

33. The device according to claim 32 wherein said magnet is rotatable relative to said mass.

34. The device according to claim 32 wherein said magnet is translatable relative to said mass.

35. The device according to claim 33 wherein said magnet is translatable relative to said mass.

36. The device according to claim 29, wherein said electric current generator receives the magnetic force from an electrical charger comprising a second magnet that attracts said magnet so as to cause said magnet to translate towards said second magnet.

37. The device according to claim 31 wherein said electric current generator comprises a rotatable shaft, and said mass is movable relative to said rotatable shaft.

38. The device according to claim 37 wherein said mass is rotatable relative to said rotatable shaft.

39. The device according to claim 32 wherein said electric current generator comprises a rotatable shaft, and said mass is rotatable relative to said rotatable shaft.

40. The device according to claim 33 wherein said electric current generator comprises a rotatable shaft, and said mass is rotatable relative to said rotatable shaft.

41. The device according to claim 33 wherein said mass and said magnet do not rotate simultaneously.

42. The device according to claim 33 wherein said mass and said magnet can rotate synchronously with one another.

43. A device comprising:
a receiver that receives a message and generates an electrical signal upon receipt of said message;
a motor having a rotatable shaft, said motor coupled to said receiver so as to receive said electrical signal;
a mass attached to said rotatable shaft, wherein said motor rotates said shaft and said mass upon receipt of said electrical signal so that said rotating mass causes said device to vibrate to such an extent that a user can readily feel said device vibrate;
a magnet attached to said motor, wherein said magnet receives a magnetic force in a non-galvanic manner and rotates so that said motor generates an electric current therefrom; and
a battery that receives said electric current.

44. The device according to claim 43 wherein said device comprises a telephone.

45. The device according to claim 43 wherein said mass is offset relative to said rotatable shaft.

46. The device according to claim 43 wherein said magnet is engageable with said rotatable shaft to rotate said rotatable shaft and generate said electric current within said motor.

47. The device according to claim 46 further comprising:
a first rotation direction sensitive clutch connected between said mass and said shaft; and
a second rotation direction sensitive clutch connected between said magnet and said shaft.

48. The device according to claim 46 wherein said magnet translates relative to said mass along said rotatable shaft.

49. The device according to claim 48 comprising a spring positioned between said mass and said magnet so as to bias said mass and said magnet away from one another.

50. The device according to claim 48 wherein said magnet receives the magnetic force from an electrical charger comprising a second magnet that attracts said magnet towards said mass until said magnet engages said mass.

51. The device according to claim 50 wherein a portion of the mass is offset with respect to the rotatable shaft; and
said magnet has a recess that receives said portion of said mass when said magnet engages said mass so that upon engagement rotation of said magnet causes said mass to rotate.

52. The device according to claim 51 wherein said device is not caused to vibrate by said mass when said engaged magnet and mass rotate.

53. The device according to claim 50 wherein said magnet comprises an alignment pin; and
said mass has an opening that receives said alignment pin when said magnet engages said mass so that upon engagement rotation of said magnet causes said mass to rotate.

54. The device according to claim 53 wherein said mass has a portion that is offset with respect to said rotatable shaft; and
said magnet has a second portion that is offset with respect to said rotatable shaft.

55. The device according to claim 54 wherein said device is not caused to vibrate by said mass when said engaged magnet and mass rotate.

56. A charger for a battery powered device, the charger comprising:
a receiving area configured to receive a battery powered device;
a motor; and
a magnet coupled with the motor so that the magnet rotates to generate a magnetic force that is transmitted to a battery powered device positioned in the receiving area in a non-galvanic manner.

* * * * *